United States Patent [19]

Korshak et al.

[11] 4,064,097
[45] Dec. 20, 1977

[54] ANTIFRICTION POLYMER MATERIAL

[76] Inventors: Vasily Vladimirovich Korshak, ulitsa Gubkina, 4, kv. 81; Irina Alexandrovna Gribova, ulitsa Vavilova, 12, kv. 31; Alexandr Petrovich Krasnov, prospekt Kalinina, 31, kv. 28; Mikhail Mikhailovich Teplyakov, ulitsa Gastello, 37, kv. 3, all of Moscow; Georgy Vasilievich Elerdashvili, ulitsa Barnova, 137, kv. 66, Tbilisi; Galina Ilinichna Gureeva, ulitsa Molostovykh, 11, korpus 5, kv. 18, Moscow; Valery Panteleimonovich Chebotarev, Zheleznodorozhny, ulitsa Dachnaya, 28, kv. 7, Moskovskaya oblast; Raisa Alexeevna Dvorikova, ulitsa Sofii Kovalevskoi, 8, kv. 19, Moscow; Vladimir Alexandrovich Sergeev, ulitsa Profsojuznaya, 54, korpus 4, kv. 26, Moscow; Dali Mitrofanovna Kakauridze, 1 Baltiisky pereulok, 6/21, korpus 5, kv. 7, Moscow, all of U.S.S.R.

[21] Appl. No.: 661,244

[22] Filed: Feb. 25, 1976

[51] Int. Cl.² .................................................. C08L 65/02
[52] U.S. Cl. .................................................. 260/37 R
[58] Field of Search .................... 260/2 H, 2 R, 37 R, 260/63 R, 63 K

[56] References Cited

U.S. PATENT DOCUMENTS

| | | |
|---|---|---|
| 3,708,455 | 1/1973 | Nakanishi et al. ............... 260/37 R |
| 3,878,113 | 4/1975 | Campbell et al. ............... 260/37 R X |
| 3,882,030 | 5/1975 | Campbell et al. ............... 260/37 R X |
| 3,971,748 | 7/1976 | Wang et al. ............... 260/37 R |

*Primary Examiner*—Lewis T. Jacobs

[57] ABSTRACT

An antifriction polymer material which is a product of hardening of a composition consisting of a filler in amounts of 10–95 wt.% and a binder in amounts of 5–90 wt.%, a mixture of polyphenylenes being used as a binder containing ketal and/or acetyl groups of the general formula

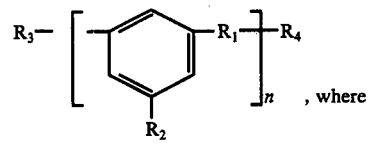

, where $n = 2-500$

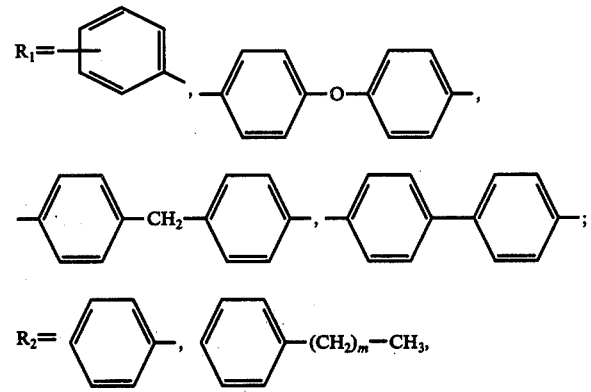

where $m = 1-4$;

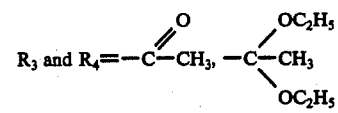

$R_3$ and $R_4$ being identical or different, the fraction with $n = 2-15$ amounting to 4–20% of the binder weight.

The proposed antifriction polymer material possesses high heat and thermal resistance of about 350°C and 450°C, respectively, which ensures a stable friction coefficient and a high wear resistance of the material at temperatures of up to 320° C.

5 Claims, No Drawings

ANTIFRICTION POLYMER MATERIAL

The present invention relates to antifriction polymer materials.

Said antifriction polymer materials combine properties of solid lubricants and construction materials. They are used for manufacturing articles, for example, separators for antifriction bearings, linings for sliding bearings, and various components of gear drives operating in dry friction units.

Antifriction polymer materials assure a low friction coefficient without commonly employed liquid or lubricants or greases.

Said materials operate under conditions where application liquid lubricants is impossible or not permissible; various electrical vacuum devices, cinema projectors, components of irradiation devices, bearings operating at high temperatures and under outer space conditions, etc.

Polymer antifriction materials are products of hardening of compositions which are multicomponent systems, consisting of a binder and a filler. As a binder use is made of polymers with required properties, primarily, thermal and heat resistance, resistance to irradiation, chemical stability, and which are easily workable. Commonly used solid lubricants such as graphite, molybdenum disulphide, boron nitride, etc., are employed as fillers of antifriction polymer materials. To strengthen a composition, fibrous fillers may also be introduced: fibre glass, asbestos, graphitized fibres, carbon fibres and the like. Metallic powders of molybdenum, nickel, copper and other metals are added to a filler for improving heat- and electroconductivity, mouldability, and increasing hardness of the antifriction polymer material.

Said fillers are introduced into the composition of the antifriction polymer material either separately or in combination.

The content of a binder and a filler in the antifriction polymer material may vary greatly, their optimum amounts being determined to suit the requirements imposed on the properties of the articles.

Known in the art is an antifriction polymer material which is a product of hardening a composition consisting of a binder and a filler. In this prior-art material polyphenylenes with ethynyl groups, obtained by polycyclotrimerization of di- and monoethynyl compounds, are used as a binder. In the course of the reaction a benzene ring is formed from three ethynyl groups substituted in positions 1, 3, 5 or 1, 2, 4. The composition consisting of said binder and filler is subjected to hardening in closed type press moulds at a temperature from 130°-450° C under a pressure ensuring solidity of the articles (from 7 to 1,000 kg/cm$^2$).

One of the principal disadvantages inherent in antifriction polymer materials produced from known compositions is their lowered wear resistance due to a decrease in their thermal resistance at temperatures about 300° C. Therefore, using said materials in dry friction units at temperatures exceeding 300° C presents difficulties.

The object of the present invention is to provide an antifriction polymer material which will possess high thermal resistance ensuring sufficiently good antifriction properties at temperatures of above 300° C.

In accordance with this and other objects, the invention consists in that an antifriction polymer material is proposed which is a product of hardening of a composition consisting of a filler and a binder, viz., a mixture of polyphenylenes. According to the invention as a binder use is made of polyphenylenes containing ketal and/or acetyl groups of the general formula

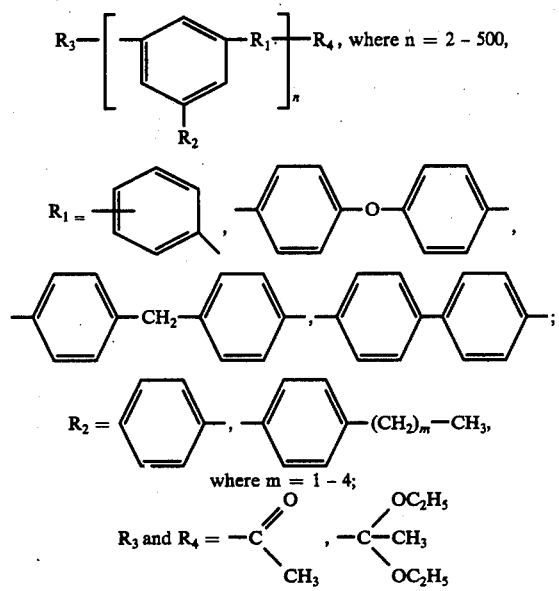

$R_3$ and $R_4$ being identical or different, the content of the filler amounting to 10–95 wt.%, the content of the binder 5–90 wt.%, the fraction with $n = 2$–15 being 4–20% of the binder weight.

In addition to the main fraction with $n = 10$–500, a fraction with $n = 2$–15 (low molecular fraction) must also be present.

The binder of such a composition permeats the filler well and on hardening (moulding) it forms articles of high thermal stability.

This is due to the fact that the low molecular fraction of polyphenylene has a large number of reactive groups and during moulding it serves as a hardener of the high molecular fraction. Said polyphenylenes are obtained in the reaction of polycyclocondensation of di- and monoacetyl compounds or their ketals.

In the course of the reaction a benzyl ring is formed from three acetyl or ketal groups substituted only in positions 1, 3 and 5.

A composition consisting of a binder and fillers is hardened in closed type press moulds at a temperature of 300°–500° C under a pressure of 50–1000 kg/cm$^2$.

The ratio of a polymer binder and fillers in the antifriction polymer material varies greatly and is determined by requirements imposed upon the article to be manufactured from this material. According to the invention the antifriction polymer material contains 5–90 wt.% of polyphenylene and 10–95 wt.%. of fillers.

As fillers the antifriction polymer material may contain substances of mineral or artificial origin, at least one of which possesses antifriction properties. They are so-called "solid lubricants" and their co-geners, the main representatives being: molybdenum disulphide, graphite, boron nitride, tungsten disulphide, tungsten diselenide, talc. Their content in the antifriction polymer material varies from 3 to 79%.

Besides the above-cited group of fillers, the proposed antifriction material may also contain fillers selected from the group of strengthening agents: carbon fibres and graphitized fibres in amounts of 20–90% of the weight of the material; from the group of metallic powders: powders of copper, nickel and silver in amounts of 10–30% of the weight of the material; as well as from the group of additives controlling the friction: quartz powder and asbestos in amounts from 0.5 to 5 wt.% of the material weight. Introduction of large amounts of solid lubricants as fillers (molybdenum disulphide, graphite, etc.) reduces the friction coefficient and yields self-lubricating materials. When high-strength antifriction materials are required, the content of a polymer binder in them may be increased up to 90wt.%.

The proposed antifriction material based on a mixture of polyphenylenes possesses high heat resistance (about 350° C) and thermal stability (about 450° C), which ensures a stable friction coefficient and high wear resistance at temperatures up to 320° C (linear wear intensity $\sim 1\times 10^{-8}$).

The antifriction polymer material is produced in the following way.

The starting polyphenylenes with ketal and/or acetyl groups can be obtained by polycyclocondensation of di- and monoacetyl compounds or their ketals. The formula of a difunctional derivative may be presented as follows:

$R_3—R_1—R_4$, where

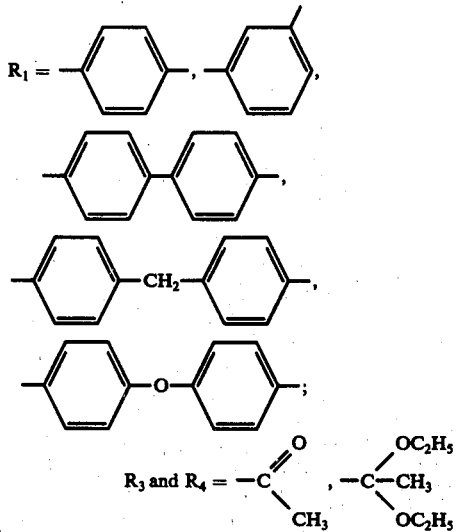

A monofunctional derivative may be presented as

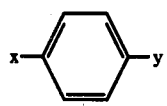

where $x = -H; -CH_3; (CH_2)_m—CH_3$, with $m = 1-4$, or is absent;

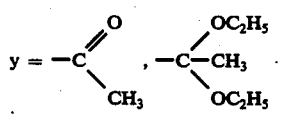

The molar ratio of di- and monofunctional derivatives is chosen from the range 1:1–1.5, respectively, the optimum molar ratio being 1:1 for producing less branched soluble polyphenylenes.

Polycyclocondensation proceeds in dry benzene at 10°–30° C in the presence of a catalyst, namely, gaseous hydrogen chloride; in the case of acetal compounds a ketalization agent is also present, viz., ethylorthoformate (triethyl ester of orthoformic acid, $HC(OC_2H_5)_3$). The reaction duration depends on the ratio between the starting di- and monofunctional compounds and the rate of passing gaseous hydrogen chloride; it varies from 0.3 to 80 hrs.

To obtain the starting polyphenylenes, mono- and diacetyl compounds or their ketals in a chosen ratio are put into a four-necked flask fitted with a stirrer, thermometer, and a capillary for introducing and leading out the catalyst, viz., gaseous hydrogen chloride. Then dry benzene is added to bring the concentration of the functional groups to 1 g.eqv/l. The flask is thermostated at a chosen temperature (10°–30° C). In the course of the reaction, the reaction mass turns from colorless to dark cherry. On completion of the reaction, the reaction mixture containing the desired product is poured into ethyl, methyl, or propyl alcohol. The precipitated product is filtered on a filter, washed with an alcohol, water alkaline solution, and water to neutral reaction. The powder is dried in a vacuum drying cabinet at 60° C. The melting point of the polyphenylene mixture obtained is within the range of 100°–220° C.

In the course of the reaction a trisubstituted benzene ring is formed according to the scheme presented below from three acetyl or ketal groups in positions 1, 3, 5.

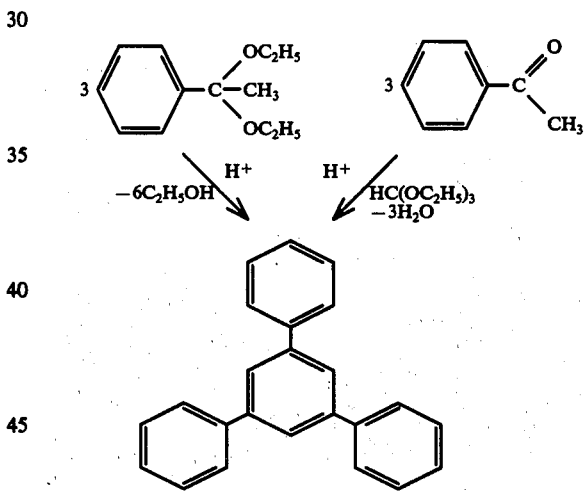

The resulting mixture of polyphenylenes, which is used as a binder for preparing the polymer antifriction material is mixed with fillers in definite weight ratios.

To ensure proper homogenation of the composition (dispersity of no more than 0.1 mm), the mixture of polyphenylenes is blended with fillers on vibration mills. As a result of mixing a pulverulent moulding composition is produced.

The moulding composition obtained is processed on a standard equipment for processing plastics by compression moulding. For manufacturing articles, the moulding composition is hardened in closed-type press moulds at 300–500° C under a pressure of 50–1,000 kg/cm².

For fibrous fillers, said starting mixture of polyphenylene is dissolved in chloroform, benzene, or other suitable organic solvent in amounts sufficient for forming a 20–50% solution. Powdered fillers are introduced into the polyphenylene solution under stirring, until a homogeneous mass is obtained.

A fibrous filler is impregnated with the obtained suspension. Impregnation of a fibrous filler with a solution of the polymer mixture without introducing a powdered filler is also possible.

After impregnation, the mass is vacuum or aid-dried at a temperature of 70°-80° C for 2-3 hrs. The material obtained is processed in closed-type press moulds at temperatures ranging from 300°-500°C and under a pressure of 50-1,000 kg/cm².

For a better understanding of the present invention specific examples are given hereinbelow by way of illustration.

EXAMPLES 1-5

Polyphenylenes containing acetyl groups, obtained by polycyclocondensation of diacetyldiphenyloxide with acetophenone, of an approximate structural formula

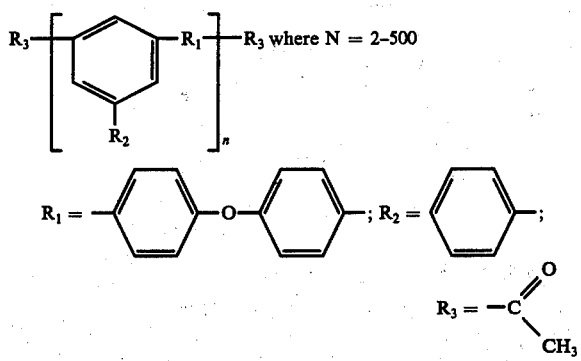

have the softening point 120°-150° C and number-average molecular weight, 3,700-8,000. Said polymers are mixed with fillers in the following ratio (see Table 1).

Table 1

| Content,wt.% | Examples | | | | |
|---|---|---|---|---|---|
| Components | 1 | 2 | 3 | 4 | 5 |
| 1. Acetyl-containing polyphenylenes | | | | | |
| main fraction | 4 | 24 | 16 | 86,4 | 36 |
| n of main fraction | 10-200 | 400-500 | 100-300 | 100-300 | 100-300 |
| low molecular fraction | | | | | |
| n of low molecular | 1 | 6 | 4 | 3,6 | 4 |
| fraction | 2-10 | 10-15 | 7-13 | 7-13 | 7-13 |
| 2. Molybdenum disulphide | 75 | — | 40 | — | 22 |
| 3. Graphite | — | 50 | 10 | — | — |
| 4. Tungsten disulphide | — | 10 | 9 | 5 | — |
| 5. Tungsten diselenide | — | — | — | — | 4 |
| 6. Talc | — | — | — | — | 3 |
| 7. Asbestos | — | — | 1 | 5 | — |
| 8. Copper powder | — | — | — | — | 30 |
| 9. Nickel powder | 20 | — | 10 | — | — |
| 10. Silver powder | — | 10 | 10 | — | — |
| 11. Quartz powder | — | — | — | — | 1 |

The resulting moulding composition which is a loose dark mass, is subjected to hardening in closed-type press moulds at 300-500° C under a pressure of 50-1,000 kg/cm².

The articles manufactured can be used as sliding bearings and separators for antifriction bearings; they ensure prolonged wear resistance of dry friction units operating at temperatures of 250°-320° C.

EXAMPLES 6-8

Polyphenylenes containing ketal groups, obtained by polycyclocondensation of ethylketals of p- or m-diacetylbenzene with acetophenone, of an approximate structural formula

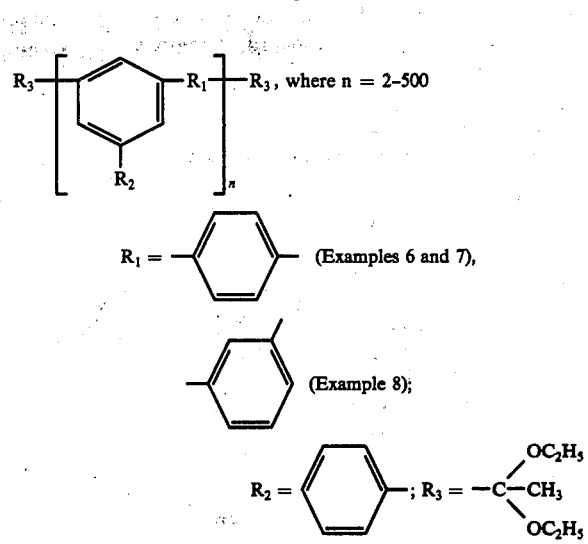

have the softening point 160°-200° C and number-average molecular weight 2,500-5,000.

Said polymers are mixed with fillers in the following ratio (see Table 2).

The articles are manufactured from moulding compositions following the procedure described in Examples 1-5 and used as linings for sliding bearings operating at temperatures up to 330° C.

Table 2

| Content,wt.% | Examples | | | | |
|---|---|---|---|---|---|
| Components | 1 | 2 | 3 | 4 | 5 |
| 1. Polyphenylenes with ketal groups | | | | | |
| main fraction | 8 | 48 | 72 | | |
| n of main fraction | 10-200 | 300-500 | 100-300 | | |
| low molecular fraction | 2 | 2 | 8 | | |
| n of low molecular fraction | 2-8 | 10-15 | 6-12 | | |
| 2. Molybdenum disulphide | 50 | 30 | 3 | | |
| 3. Graphite | 20 | — | — | | |
| 4. Tungsten disulphide | 9 | 5 | — | | |
| 5. Tungsten diselenide | — | — | 4 | | |
| 6. Talc | — | — | 3 | | |
| 7. Asbestos | 0,5 | 5 | — | | |
| 8. Copper powder | — | — | 10 | | |
| 9. Nickel powder | 10 | — | — | | |
| 10. Silver powder | — | 10 | — | | |
| 11. Quartz powder | 0.5 | — | — | | |

EXAMPLES 9-13

Polyphenylenes obtained by polycondensation of di-derivatives, viz., diacetyldiphenyloxide or m- or p-diacetylbenzene, diacetyldiphenylmethane or ketals of these compounds, and mono-derivatives, viz., acetophenone or p-ethylacetophenone, of an approximate structural formula

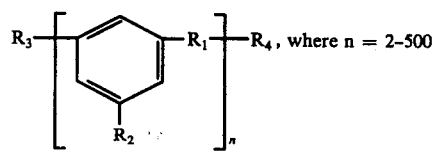

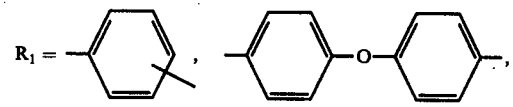

Examples 9, 10     Example 13

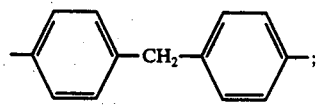

Example 12

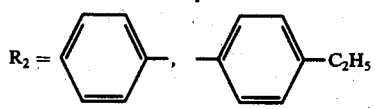

Examples 9–11, 13

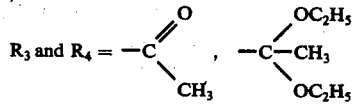

are filled with fillers in the following ratio (see Table 3). For preparing the composition, polyphenylenes are dissolved in chloroform or any other suitable organic solvent, powdered fillers (molybdenum disulphide, graphite boron nitride, etc.) are added, and the mixture is stirred until a homogeneous viscous mass is obtained. Carbon or graphitized fibre (fabric is immersed into said mass. The impregnated fabric is dried at 70°–80° C for 2–3 hours. The dried impregnated mass is moulded in closed-type press moulds over the temperature range of 300°–500° C under Table 3

| Content, wt.% | Examples | | | | |
|---|---|---|---|---|---|
| Components | 1 | 2 | 3 | 4 | 5 |
| 1. Polyphenylenes with acetyl and ketyl groups | | | | | |
|   main fraction | 8 | 36 | 9 | 32 | 57,6 |
|   n of main fraction | 300–500 | 10–200 | 100–250 | 10–200 | 10–200 |
|   low molecular fraction | 2 | 4 | 1 | 8 | 2,4 |
|   n of low molecular | 10–15 | 2–8 | 6–10 | 2–8 | 2–8 |
| 2. Carbon fibre | 40 | 30 | 90 | — | — |
| 3. Graphitized fibre | — | — | — | 20 | 40 |
| 4. Molybdenum disulphide | 50 | 20 | — | 15 | — |
| 5. Graphite | — | 10 | — | 10 | — |
| 6. Boron nitride | — | — | — | 5 | — |
| 7. Nickel powder | — | — | — | 10 | — | a pressure of 50–1,000 kg/cm².

The manufactured articles have hardness of 15–30 kg/mm² and a specific impact strength from 7 to 13 kgcm/cm². The intermediate products are used for manufacturing linings for sliding bearings, with a wear resistance (linear wear intensity) of $1 \times 10^{-8}$ at 320° C.

What is claimed is:

1. An antifriction polymer material which is a product of hardening a composition consisting of a filler comprising a solid lubricant, fibrous material, metallic powder and friction regulating additives, in an amount of 10–95 wt.% and a binder in an amount of 5–90 wt.%, a mixture of polyphenylenes being used as a binder containing functional groups selected from ketal or acetyl groups, of the formula

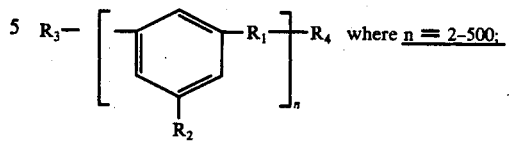

wherein:

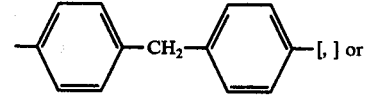

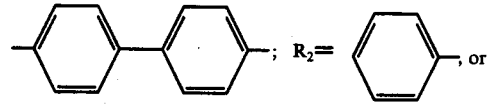

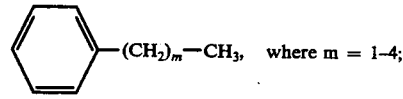

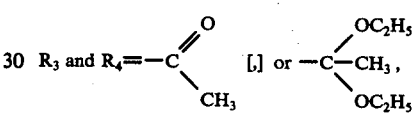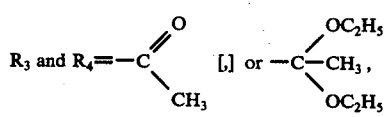

$R_3$ and $R_4$ being identical or different; the fraction with $n = 2–15$ amounting to 4–20% of the binder weight.

2. An antifriction polymer material as claimed in claim 1, wherein as a filler it contains a solid lubricant selected from the group consisting of molybdenum disulphide, graphite, boron nitride, tungsten disulphide, tungsten diselenide, and talc in amounts of 3–79% of the weight of the antifriction polymer material.

3. An antifriction polymer material as claimed in claim 1, wherein as a filler it contains a fibrous material selected from the group consisting of graphitized fibre and carbon fibre in amounts of 20–90% of the weight of the antifriction polymer material.

4. An antifriction polymer material as claimed in claim 1, wherein as a filler it contains metallic powders, selected from the group consisting of copper, nickel, or silver powders in amounts of 10 to 30% of the weight of the antifriction polymer material.

5. An antifriction polymer material as claimed in claim 1, wherein as a filler it contains friction-regulating additives selected from the group consisting of quartz powder and asbestos in amounts of 0.5 to 5% of the weight of the friction polymer material.

* * * * *